United States Patent [19]

Santini

[11] Patent Number: 4,919,404
[45] Date of Patent: Apr. 24, 1990

[54] LEAF SPRING ATTACHMENT

[75] Inventor: Franco Santini, Flero, Italy

[73] Assignee: Iveco Fiat S.p.A., Turin, Italy

[21] Appl. No.: 350,285

[22] Filed: May 11, 1989

[30] Foreign Application Priority Data

May 16, 1988 [IT] Italy .................. 53154/88[U]

[51] Int. Cl.⁵ .................................. F16F 1/26
[52] U.S. Cl. .................................. 267/260
[58] Field of Search ............ 267/41, 44, 158, 260, 267/261, 266, 271

[56] References Cited

U.S. PATENT DOCUMENTS

| 804,341 | 11/1905 | Plumb | 267/260 |
| 1,129,278 | 2/1915 | Dodge et al. | 267/260 |
| 1,620,756 | 3/1927 | Curtis | 267/266 |

Primary Examiner—Duane A. Reger
Attorney, Agent, or Firm—Sughrue, Mion, Zinn, Macpeak & Seas

[57] ABSTRACT

A leaf spring attachment comprises a support for fixing to the structure of the vehicle and an omega-shaped bracket fixed to the support so as to define two facing walls between which a pin for supporting the eye of the leaf spring is mounted. The support comprises first and second metal strips welded together centrally in an X arrangement.

6 Claims, 1 Drawing Sheet

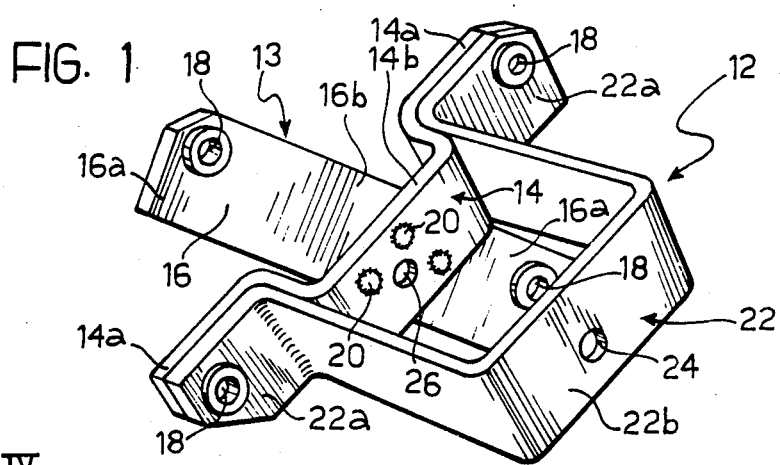
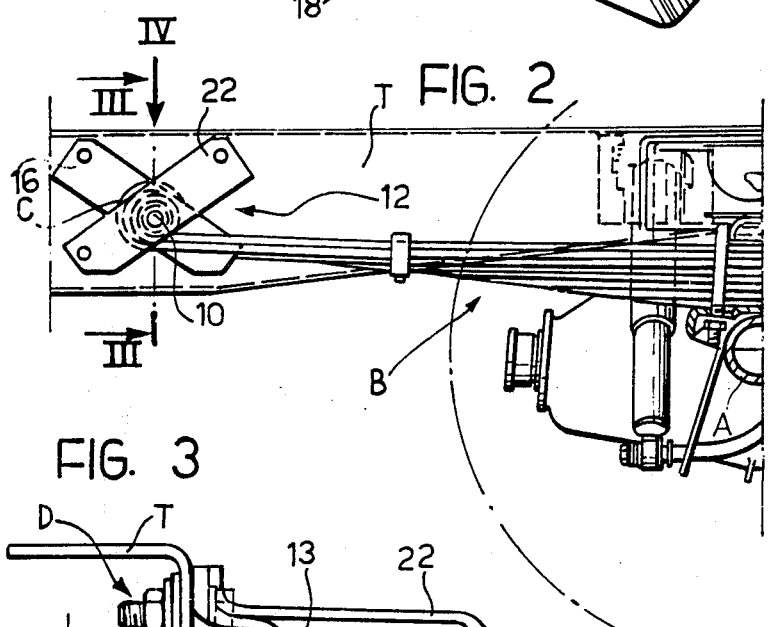
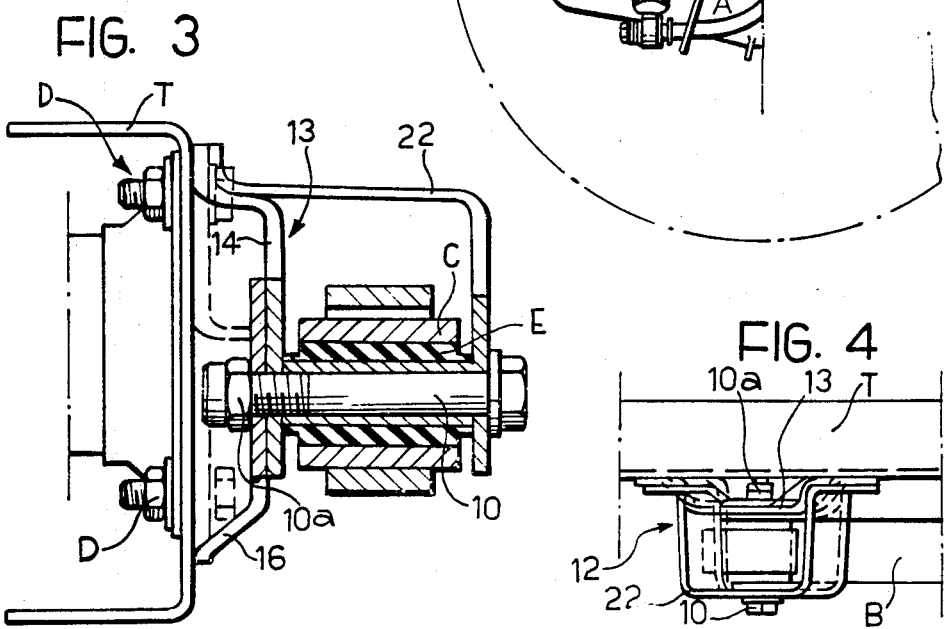
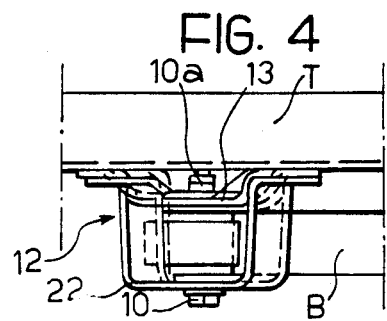

LEAF SPRING ATTACHMENT

DESCRIPTION

The present invention relates to a leaf spring attachment of the type comprising a support and an omega-shaped bracket fixed to the support so as to define two facing walls between which a pin for the eye of the leaf spring is mounted.

Known solutions provide for the use of a bracket of complex shape connected to a plate-like support.

The object of the present invention is to provide an attachment of the type specified at the beginning of the description, which has a simpler construction, a lower cost, a smaller production investment and a reduced weight.

According to the invention, this object is achieved by virtue of the fact that the support comprises first and second metal strips joined together centrally in an X arrangement and having ends adapted for fixing to the structure of the vehicle.

Thus, the production of the attachment does not require specific pressing operations, but simply the blanking and shaping of metal strips of equal width, and the welding and drilling thereof.

Further characteristics and advantages of the attachment according to the invention will become clear from the detailed description which follows with reference to the appended drawings, provided by way of non-limiting example, in which:

FIG. 1 is a perspective view of an attachment according to the invention,

FIG. 2 is a partial side view of a leaf spring suspension provided with the attachment of FIG. 1, FIG. 3 is a section taken on the line III—III of FIG. 2, and FIG. 4 is a view taken on the arrow IV of FIG. 2.

With reference to the drawings, a leaf spring for the suspension of a commercial vehicle, for the resilient connection of the chassis T of the vehicle to the rear axle A, is indicated B. The leaf spring B is provided, forwardly with respect to the vehicle, with a coiled eye C supported by a horizontal pin 10 mounted on an attachment 12 fixed to the chassis T.

The attachment 12 has a support 13 formed by a first shaped metal strip 14 and a second shaped metal strip 16 which are welded together in an X arrangement and are provided with respective ends 14a and 16a having through-holes 18 for their fixing to the chassis T of the vehicle by means of bolts D.

The shaped metal strips 14 and 16 are welded together in correspondence with respective central portions 14b and 16b which are U-shaped so as to define sufficient space between the support 13 and the chassis for the mounting of a nut 10a for the fixing of the pin 10. The welding of the metal strips 14 and 16 is carried out in correspondence with through-holes 20 in the first metal strip 14. The attachment 12 also includes an omega-shaped bracket 22 having a width equal to that of the first strip 14 and provided with ends 22a which are superposed on the ends 14a of the first metal strip 14. The bracket 22 is joined to the first metal strip by welding.

The bracket 22 has a central portion 22b which faces the central portion 14b of the first metal strip 14 and is provided with a through-hole 24 coaxial with a corresponding through-hole 26 in the metal strips 14 and 16 for the mounting of the bolt which constitutes the pin 10.

A vibration-damping bush E of elastomeric material is interposed in known manner between the latter and the coiled eye C of the leaf spring B.

I claim:

1. A leaf spring attachment of the type comprising a support and an omega-shaped bracket fixed to the support so as to define two facing walls between which a pin for the eye of the spring is mounted, wherein the support comprises first and second metal strips joined together centrally in an X arrangement and having ends adapted for fixing to the structure of the vehicle.

2. A leaf spring attachment according to claim 1, wherein the metal strips are produced by blanking and shaping.

3. A leaf spring attachment according to claim 1, wherein each metal strip has a raised U-shaped central portion.

4. A leaf spring attachment according to claim 1, wherein the ends of the metal strips have through-holes for their fixing to the structure of the vehicle.

5. A leaf spring attachment according to claim 1, wherein the first metal strip has a width substantially equal to that of the bracket and is welded to the latter so as to define an annular quadrangular portion in which the pin is mounted.

6. A leaf spring attachment according to claim 5, wherein the first metal strip has through-holes whose edges are welded to the underlying central portion of the second metal strip.

* * * * *